(No Model.)  
2 Sheets—Sheet 1.
C. E. HADLEY.
WHEEL AND CHAIN GUARD FOR BICYCLES.
No. 557,267.  
Patented Mar. 31, 1896.
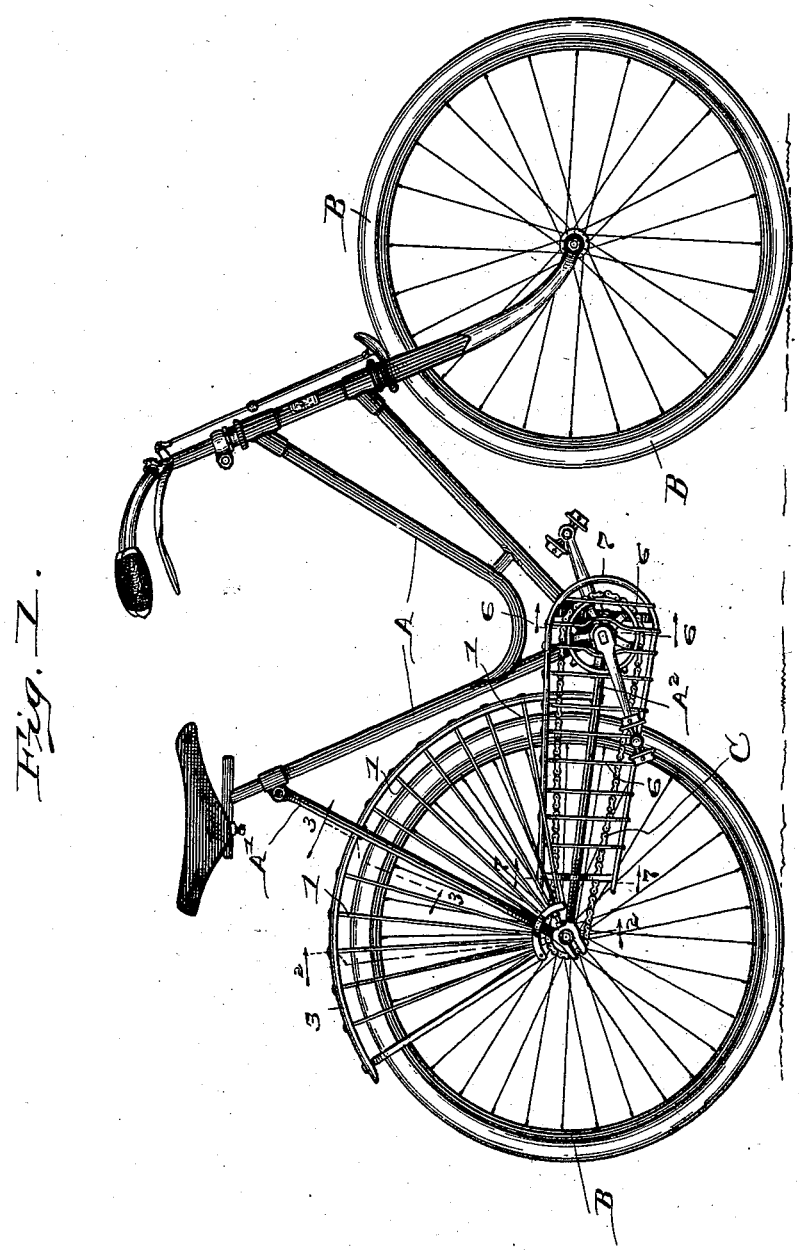
WITNESSES:  
INVENTOR  
Charles E. Hadley,  
BY Chester F. Bradford.  
ATTORNEY.

(No Model.) 2 Sheets—Sheet 2.
C. E. HADLEY.
WHEEL AND CHAIN GUARD FOR BICYCLES.
No. 557,267. Patented Mar. 31, 1896.
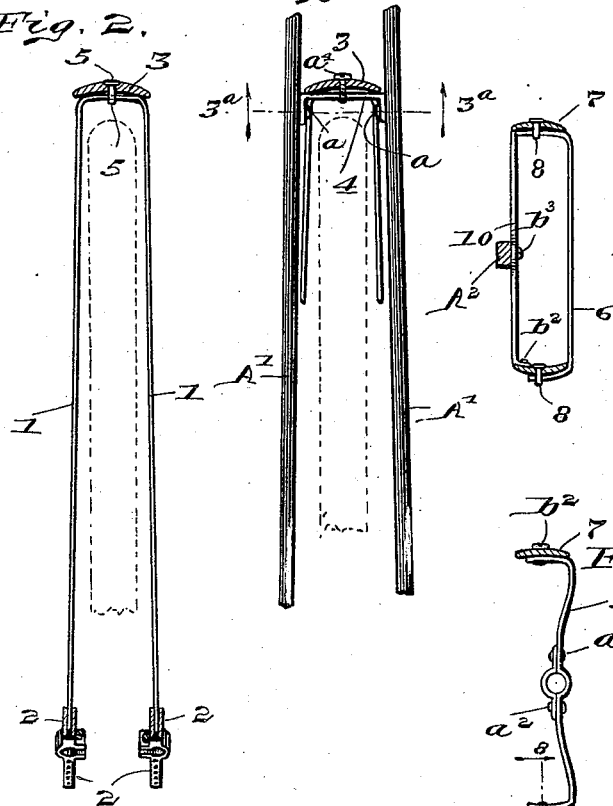
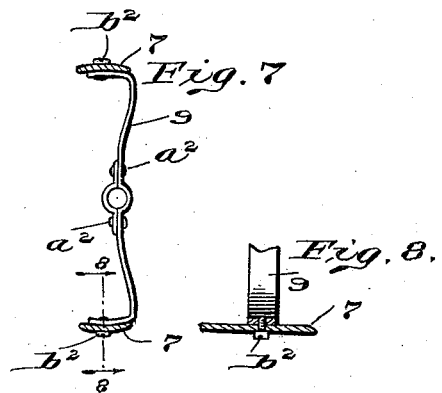
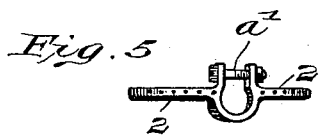
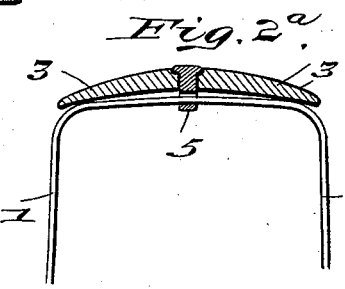
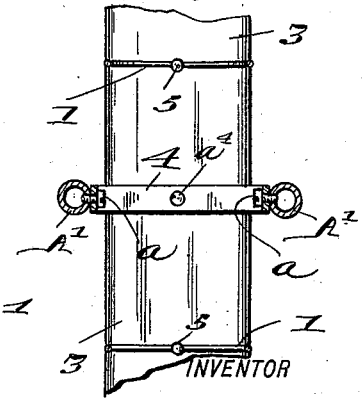

UNITED STATES PATENT OFFICE.

CHARLES E. HADLEY, OF INDIANAPOLIS, INDIANA, ASSIGNOR TO THE INDIANA BICYCLE COMPANY, OF SAME PLACE.

WHEEL AND CHAIN GUARD FOR BICYCLES.

SPECIFICATION forming part of Letters Patent No. 557,267, dated March 31, 1896.

Application filed October 14, 1895. Serial No. 565,614. (No model.)

*To all whom it may concern:*

Be it known that I, CHARLES E. HADLEY, a citizen of the United States, residing at Indianapolis, in the county of Marion and State of Indiana, have invented certain new and useful Improvements in Wheel and Chain Guards for Bicycles, of which the following is a specification.

The object of my said invention is to produce light, inexpensive, and easily attachable and removable wheel and chain guards for bicycles.

Said invention will be first fully described, and the novel features thereof then pointed out in the claims.

Referring to the accompanying drawings, which are made a part hereof, and on which similar letters and numerals of reference indicate similar parts, Figure 1 is a side elevation of a bicycle equipped with chain and wheel guards embodying my said invention; Fig. 2, a detail sectional view, on an enlarged scale, as seen when looking in the direction indicated by the arrows from the dotted line 2 2 in Fig. 1; Fig. $2^a$, a detail view similar to a portion of Fig. 2, but on a still further enlarged scale, and showing the connecting-bolt in section; Fig. 3, a detail sectional view as seen when looking in the direction indicated by the arrows from the dotted line 3 3 in Fig. 1; Fig. $3^a$, a detail sectional view looking upwardly from the dotted line $3^a$ $3^a$ in Fig. 3; Fig. 4, a side elevation of the lower guard-wire holder; Fig. 5, a top or plan view of the same; Fig. 6, a detail sectional view as seen from the dotted line 6 6 in Fig. 1; Fig. 7, a view as seen from the dotted line 7 7, and Fig. 8 a detail view on the dotted line 8 8 in Fig. 7.

In said drawings the portions marked A represent the frame of a bicycle, B the wheels thereto, and C the chain, all of which are or may be of any usual or desired construction.

My improved wheel-guard consists of a series of bent guard-wires 1 mounted at the lower ends in supports or holders 2, and carrying at the upper side a wooden guard-strip 3, which is also secured to the adjacent portions $A'$ and $A^2$ of the frame A by brackets 4, which, in turn, are secured to said frame by screws $a$. The wires 1 are connected to the strip 3 by connecting-bolts 5, as shown most plainly in Fig. $2^a$, said bolts having heads which rest upon and are preferably countersunk into the outer surface of said strip, and perforated inner ends which extend to below said strip through the perforations in which said wires 1 pass, the arrangement being such that said wires bear against said bolts in the center with a spring force, resting against the strip 3 itself at or near the outer edges thereof, as also illustrated most plainly in said Fig. $2^a$.

The form of the guard-wire holder 2 is best shown in Figs. 4 and 5. It is formed to embrace the part $A'$ of the frame A and be clamped firmly thereon by means of a bolt $a'$. It is provided with a series of perforations to receive the lower ends of the wires 1, as shown in Figs. 2 and 5, and also by the dotted lines in Fig. 4. When it is desired to remove this guard from the bicycle, it may be done by simply withdrawing the screws $a$ from their engagement with the frame parts $A'$ and $A^2$, when the strip 3 and the wires 1 are readily lifted off. Then by taking out the bolt $a'$ the lower wire-holder 2 can also be removed from its engagement with the frame parts $A'$.

The chain-guard is similar in construction to the wheel-guard, and consists of the wires 6 and wooden strip 7 connected together by bolts 8, which are like the bolts 5. It is secured to the frame part $A^2$ by brackets 9 and 10, which are united to said frame part by bolts or screws $a^2$. Said brackets are connected to said strips by means of bolts or screws $b^2$.

As will be readily observed, I have succeeded in securing in guards of this character light, flexible, and easily-detachable guard-wires with wooden guard-strips, from which the wires may be easily separated when desired, and generally a construction in which the utmost lightness consistent with durability is secured, together with inexpensiveness of construction and facility of assembling and disassembling the parts.

Having thus fully described my said invention, what I claim as new, and desire to secure by Letters Patent, is—

1. The combination, in a guard structure, of a suitable guard-strip, and guard-wires extending transversely thereof and thence over the structure to be guarded, said strip and said wires being secured together by uniting-bolts passing through said strip and having perforations through which the wires pass.

2. The combination, in a guard structure, of a guard-strip concave in cross-section on its under side, attaching-bolts passing through said guard-strip centrally and having heads on the outer ends and perforations through the inner ends, and guard-wires the central portions whereof pass transversely across said guard-strips and through said perforations and bearing centrally upon the points where they touch said bolts and also bearing near the ends of the transverse portions upon the under side of the guard-strips, whereby the inherent spring force of the wires is utilized in holding said guard-wires in position, they being at the same time readily detachable from said guard-strips, substantially as set forth.

In witness whereof I have hereunto set my hand and seal, at Indianapolis, Indiana, this 10th day of October, A. D. 1895.

CHARLES E. HADLEY. [L. S.]

Witnesses:
CHESTER BRADFORD,
JAMES A. WALSH.